United States Patent

[11] 3,617,071

| | | | |
|---|---|---|---|
| [72] | Inventor | Davor Ivancic Via Ticino, San Donato Milanese(Province of Milan), Italy | |
| [21] | Appl. No. | 29,349 | |
| [22] | Filed | Apr. 2, 1970 | |
| [45] | Patented | Nov. 2, 1971 | |
| [32] | Priorities | Mar. 5, 1969 | |
| [33] | | Italy | |
| [31] | | 16388; Apr. 5, 1969, Italy, No. 15171 | |

[54] STEERING MECHANISM FOR AUTOMOBILES
5 Claims, 8 Drawing Figs.

[52] U.S. Cl. ............................................ 280/96, 74/498
[51] Int. Cl. .................................................. B62d 7/08
[50] Field of Search ...................................... 280/95, 96, 91, 93, 87; 180/45

[56]  References Cited
UNITED STATES PATENTS

| 2,251,584 | 8/1941 | Fageol et al. | 280/91 X |
| 2,814,499 | 11/1957 | Schlechter | 280/96 X |
| 2,824,749 | 2/1958 | Yasuda | 280/96 X |
| 3,235,283 | 2/1966 | De Voghel | 280/91 |
| 3,315,975 | 4/1967 | De Voghel | 280/91 |
| 3,495,847 | 2/1970 | Rey | 280/95 |

FOREIGN PATENTS

| 806,730 | 10/1936 | France | 280/91 |

*Primary Examiner*—Kenneth H. Betts
*Attorneys*—Guido Modiano and Albert Josif

ABSTRACT: Steering mechanism for the front wheels of an automobile comprising a crank gear transmission controlled by the steering wheel and transmitting a reciprocating and angular motion to a connecting rod supported in an intermediate point thereof by a link bracket support. The connected rod is articulated to the free end of an arm rigid with the supporting hub or drum of the wheel, and pivotally supported in an intermediate point thereof, and allowing the front wheel to swivel through an angle of more than 90°.

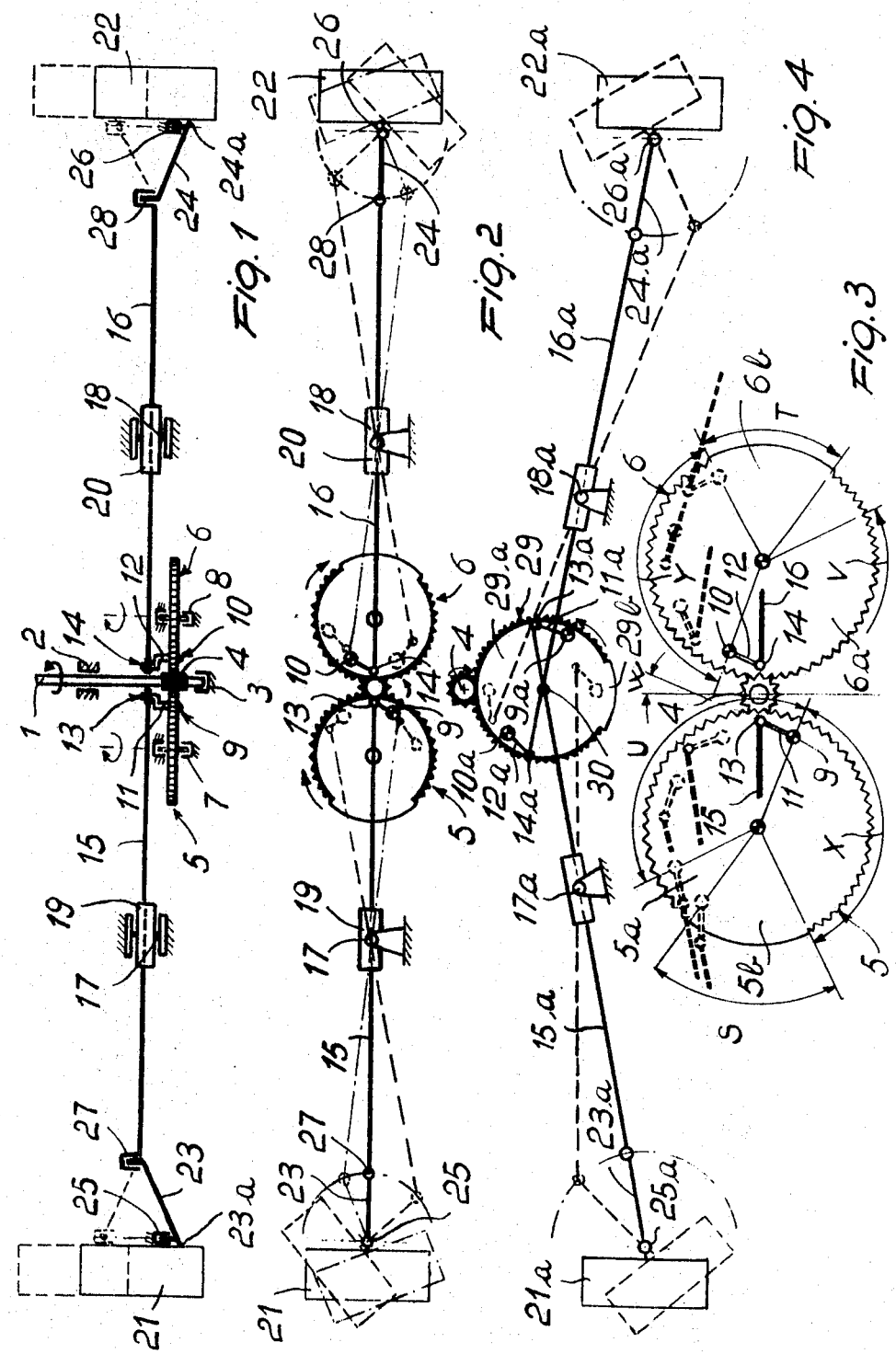

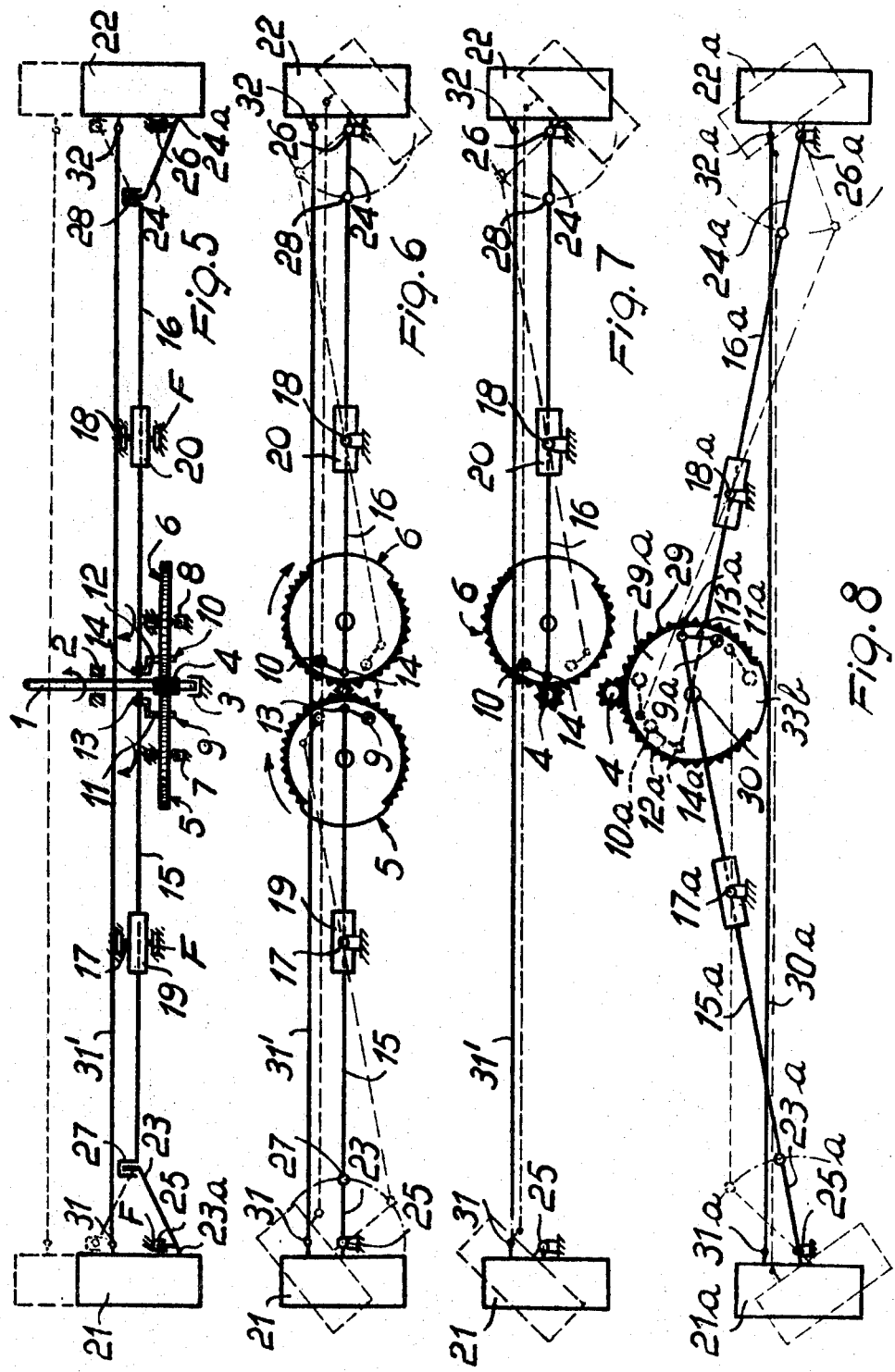

STEERING MECHANISM FOR AUTOMOBILES

BACKGROUND OF THE INVENTION

This invention relates to a steering mechanism particularly for front wheels of automobiles.

The known steering mechanisms make use of transmission linkages between the steering column and the front wheels of the automobile, which allow to perform a reduced steering angle.

SUMMARY OF THE INVENTION

An object of this invention is to remove this shortcoming, by providing a steering mechanism through which a steering angle even of more than 90° may be obtained.

Another object of this invention is to provide a steering mechanism of simple construction and particularly suitable for those vehicles, which have to be maneuvered within a reduced space.

Another object is to provide a steering mechanism in which the strong couples transmitted by the front wheels of this type to the steering mechanism during the braking of the automobile are removed.

These and other objects which will appear from the description which follows, are attained by a steering mechanism for a pair of spaced-apart vehicle wheels with a wheel drum and a supporting frame for the vehicle, comprising in conjunction with at least one of said wheels, a bracket member having one end thereof connected with the drum of the wheel and extending transverse in a direction towards the other of said wheel and an articulation end of said bracket member, pivot means for said bracket member arranged in an intermediate point thereof between said one end and said articulation end thereof and supported on said supporting frame, a connecting rod member hingedly connected with one extremity thereof to said articulation end and extending transverse to said drum beyond said bracket member towards the other of said wheels and having another extremity thereof, a link bracket support supported on said supporting frame and slidably supporting said connecting rod member thereby to allow a to-and-fro motion thereof along the longitudinal direction thereof and an oscillating motion thereof about said link bracket support, a steering column and crank gear transmission means connecting said steering column with said another extremity of said connected rod member thereby to impart an angular and a reciprocating motion to said connecting rod member when the steering column is rotated, and to swivel thereby the bracket member and the wheel about the pivot means.

Some embodiments of the invention will be described hereinafter with reference to the accompanying drawing in which:

FIG. 1 is a diagrammatic front view of the steering mechanism;

FIG. 2 is a diagrammatic plan view of the steering mechanism;

FIG. 3 shows diagrammatically a detail of FIG. 2 on an enlarged scale;

FIG. 4 is a diagrammatic plan view of a modified embodiment of the steering mechanism;

FIG. 5 is a diagrammatic front view of a further embodiment of the invention;

FIG. 6 is a diagrammatic plan view of the embodiment shown in FIG. 5;

FIG. 7 is a diagrammatic plan view of an additional embodiment of the invention and FIG. 8 is a diagrammatic plan view of a further modified embodiment of the invention.

With reference to FIGS. 1 and 2, 1 indicates a steering column controlled by a steering wheel of the automobile (not shown). The steering column is rotatorily supported in conventional manner on the vehicle frame in 2 and 3. 4 is a pinion rigid with the steering column 1 and in mesh with transmission gears 5 and 6 in the form of equal toothed circular sectors pivoted in 7 and 8, respectively, on the vehicle frame. Near their periphery the transmission gears 5 and 6 carry hinge means 9 and 10, respectively, on which compensation levers 11 and 12 are hinged respectively. The other ends of these compensation levers are hinged in articulation joints 13 and 14 of connecting rod members 15 and 16, respectively. The connecting rod member 15 is slidable articulated on the vehicle frame by means of a link bracket support 19 hinged in 17 on the vehicle frame F. In this way the connecting rod member 15 may perform a to-and-fro motion in the longitudinal direction thereof and at the same time also an angular motion about the hinge 17. The connecting rod member 16 is supported in similar manner by the link bracket support 20 and the hinge 18.

Horizontally rigid with the hub of drum members diagrammatically shown at 21 and 22, on which the wheels are rotatably supported, are the bracket members 23 and 24, pivoted in 25 and 26, respectively, on the frame F of the vehicle and articulated in 27 and 28 with the connecting rod members 15 and 16. The brackets 23 and 24 are fixed in a suitable point 23a and 24a of the drum of hub members 21 and 22, respectively, but the pivot articulations 27 and 28 thereof are arranged in a plane, perpendicular to the wheels and passing through the axis of rotation of the wheels.

The differently dotted lines of FIG. 2 show two different positions taken by the steering mechanism, in addition to that shown in full line. The configuration shown in dot and dash line shows a rotation of the wheels to the left, whereas the configuration shown in dashed lines relates to a rotation towards right.

FIG. 3 shows diagrammatically the transmissions gears 5 and 6, when the wheels are straight as shown in full line in FIG. 2. The transmission gears 5 and 6 have toothed circular sectors 5a and 6a, respectively, which mesh with the pinion 4. These gears have also smooth sectors 5b and 6b respectively. The representation in full line of FIG. 3 shows the neutral configuration of the steering mechanism taken by the members 9 through 16 relating to the respective transmission gears 5 and 6 when the wheels are directed straight forwards.

U and X indicate the angles, which the pivot connection 9 of the compensation lever 11 describes during the steering movement of the wheels through an angle of 90° towards the right and towards the left, respectively. Similarly, V and Y indicate the angles which are described by the pivot connection 10 of the compensation lever 12 when the steering action is of 90° towards the right and 90° towards the left, respectively. S and T are the angles defined by the smooth circular sectors 5b and 6b of the gears 5 and 6, respectively. W indicates the angle, which may be adjusted at wish, taken by the compensation levers 11 and 12 with respect to the normal forward direction of the vehicle, when the steering mechanism takes its configuration of 0 steering angle. Indicated with dashed lines on the transmission gear 5 are four positions of the compensation lever 11 and the arm or connecting rod 15, corresponding to four steering angles towards the right. Similarly on the transmission gear 6 three positions of the corresponding symmetric elements are shown for steering angles towards the left.

FIG. 4 shows diagrammatically an embodiment with a single transmission gear and with laterally offset connecting rods, inclined with respect to each other. 29 indicates the single transmission gear in mesh with the pinion 4. This transmission gear comprises a toothed circular sector 29a and a smooth circular sector 29b, which cannot mesh with pinion 4. In the shown straight wheel configuration (0 steering angle) the articulation point 13a of the connecting rod 15a lies on a section diametrically opposite to the articulation point 17a with respect to the center of rotation 30 of the transmission gear 29. Similarly, the articulation point 14a is diametrically opposite to the section on which the hinge 18a lies, with respect to the same center of rotation 30. The compensation levers 11a and 12a are pivoted on the connecting rods 15a and 16a in points 13a and 14a, respectively, which rotate with respect to the transmission gear 29 about the articulation points 9a and 10a respectively. The rotating levers or brackets 23a and 24a rigid with the hubs or drums 21a and 22a, respectively, rotate about the hinges 25a and 26a, respectively. FIG. 1 shows in dashed lines an embodiment in which the brackets 23 and 24 have two degrees of liberty in their movement, such to allow the upward displacement of the wheels 21 and 22. This performance may be obtained, for example, by means of universal joints used in points 27 and 28 and supporting the hinges 25 and 26 on conventional shock absorbers. The length of the elements of each symmetrical counterpart are equal. The operation of the embodiments shown in FIGS. 1-4 is as follows.

When the steering column 1 is rotated about its own axis in a clockwise direction (steering towards the right) or counterclockwise direction (steering towards the left), the pinion 4 transmits a rotation in the opposite direction to the transmission gears 5 and 6. The compensation levers 11 and 12 perform a revolving movement together with said transmission gears and a rotational movement about the articulation points 9 and 10. The pairs of elements 11-15 and 12-16 operate as crankshaft connecting rod pairs, since the cranks perform a rotatory movement and the connecting rods 15 and 16 perform a translatory and a rotational movement about the hinges 17 and 18, respectively. In the embodiment where the brackets 23 and 24 have a single degree of liberty, the end hinges 27 and 28 describe equal circular arcs about the pivots 25 and 26, respectively.

It should be noted that the axis of rotation of the pinion 4, shown in FIGS. 1, 2 and 3, is not necessarily aligned with the axis of rotation of the transmission gears 5 and 6; furthermore the gear formed of pinion 4 and Ltoothed sector 29a shown in FIG. 4 may be differently turned in order to satisfy constructive and assembling requirements. According to a modified embodiment, the toothed gear, which is actuated by the steering column may be of the worm-gear type and at least one of the circular sectors may be provided with helical toothing in mesh with the worm gear.

According to another modified embodiment the steering mechanism using two toothed circular sectors in mesh with a pinion, may have connecting rod members, the articulation pivots whereof are not aligned in at least one condition of 0 steering angle.

The embodiments shown in FIGS. 5, 6 and 8 are equal to those of FIGS. 1 through 4, with the exception of the stiffening tie rod 31 added therein.

In FIGS. 5 through 8 the reference numerals 1 through 30 indicate the same members described previously. The stiffening tie rod is indicated with 31' and is pivotally connected to the wheel 21 with the end 31 thereof and is pivotally connected with the other end 32 thereof with the wheel 22. The length of the tie rod 31' between the articulations 31 and 32 thereof is equal to the distance between the hinge points 25 and 26. The distance between the pivot points 25, 31 and 26, 32 are equal and amount to 0.3-0.8 times the length of the bracket 23 or 24. The rod 31', the structure between the pivots 25, 31 and 26, 32 form 25 and 26, the wheel structure between the pivots 25, 31 and 26, 32 form together an articulated quadrilateral, whereof the structure between the pivots 25 and 26 is the fixed side.

FIG. 6 shows in dashed lines a position taken by the steering mechanism when steering towards the right.

FIG. 7 shows a modified embodiment, in which one of the symmetric structure of FIGS. 1 and 2 has been removed. According to this embodiment, the wheel 21 is steered by the tie rod 31'. The articulated quadrilateral defined by the hinges 25, 26, 32 and 31, operates in this embodiment in a manner similar to that described above.

According to this embodiment, since the condition of symmetry of the actuating elements is lacking, the remaining actuating elements 4, 6 and 16 in the case of FIG. 7 may be advantageously changed as far as their positioning and dimensions are concerned. For instance the pinion 4 may be arranged nearer to wheel 22 and the length of connecting rod 16 may be shortened.

In FIG. 8 an embodiment is diagrammatically shown, in which only one transmission gear is used and in which the connecting rods are offset with respect to each other, so that they may cross without actually intersecting each other. These connecting rods are arranged under the single transmission gear and are inclined one with respect to the other. The stiffening rod 30a is pivoted on the wheel 21a in 31a and on the wheel 22a in 32a according to the same geometrical characteristics as above described with reference to FIGS. 5 and 6.

In the embodiment shown in FIG. 8 one of the symmetrical assembly groups of the mechanism may be omitted in a manner analogous to that shown in FIG. 7. Furthermore it will appear evident that the embodiment with two transmission gears of FIGS. 5 and 6 may be carried out with inclined connecting rods 15 and 16, in a manner analogous to that of FIG. 8.

FIG. 5 shows in dashed lines an embodiment according to which the levers or brackets 23 and 25 have two degrees of liberty, thereby allowing an upward displacement of the wheels 21 and 22 as previously described with respect to FIG. 1. The length of the elements of every pair of symmetrical elements are equal.

The operation of the device according to the embodiments shown in FIG. 5-8 is as follows.

A clockwise rotation (steering towards the right) or counterclockwise rotation (steering towards the left) imparted to pinion 4 through steering column 1 is transmitted to the wheel pairs through the pairs of symmetric elements 5-6, 15-16 and 23-24.

According to the embodiment of FIGS. 5 and 6, the tie rod 31' has the function to follow up the rotation of the wheels 21-22, thereby behaving as a parallelly movable side of an articulated quadrilateral, as previous described, whereas it becomes an active element of particular importance during the acceleration or braking operation of the automobile. In particular, during the braking operation, the device shown in FIG. 7 compensates, through the tie rod 31' which operates either as traction or compression member, the internal forces which are generated in the absence of such stiffening or tie rod due to the force couples acting on the fixed pivots 25 and 26, due to the braking action. In a perfectly analogous manner operates the stiffening rod or arm 30a of FIG. 8 during the braking operation or acceleration of the automobile. More particularly, the stiffening or tie rod 31' of FIGS. 5, 6, 7 (and 30a of FIG. 8) if arranged before the pair of articulation points 25-26 (and 25a-26a of FIG. 8) with respect to the forward direction of the vehicle and the wheels 21-22 (and 21a-22a) are not the driving wheels, operates as a traction rod in the braking and accelerating operation of the vehicles. By contrast, if such stiffening rod is behind the pair of articulation points as above mentioned and the wheels are not driving wheels, such stiffening or tie rod operates as a compression or strut member during the braking and accelerating operations. When the above-mentioned wheels are drive wheels the action of the stiffening or tie rod is reversed only during the acceleration operation.

According to the modification shown in FIG. 7 the rotatory motion of pinion 4 is transmitted to the wheel 22 through a toothed wheel 6, the connecting rod 16 and the bracket 24, whereas the other wheel 21, pivoted in 25, is moved parallelly with the wheel 22 by means of the stiffening rod 30 which in this case is also a wheel actuating member.

The invention should not be construed as limited to the shown embodiments and all modifications or the use of equivalent members or structures may be made within the scope of the following claims.

It will be understood that the connection between bracket 23 or 24 with the hub or drum 21 or 22 respectively may advantageously be of such type which is rigid in a horizontal plane and allowing angular movement in a vertical plane between the bracket and the respective drum, e.g., by providing a hinge connection therebetween with the hinge axis extending in a horizontal direction.

I claim:

1. Steering mechanism for a pair of spaced-apart vehicle wheels with a wheel drum and a supporting frame for the vehicle, comprising in conjunction with at least one of said wheels, a bracket member having one end thereof connected with the drum of the wheel and extending transverse thereto in a direction towards the other of said wheel and an articulation end of said bracket member, pivot means for said bracket member arranged in an intermediate point thereof between said one end and said articulation end thereof and supported on said supporting frame, a connecting rod member hingedly connected with one extremity thereof to said articulation end and extending transverse to said drum beyond said bracket member towards the other of said wheels and having another extremity thereof, a link bracket support supported on said supporting frame and slidably supporting said connecting rod member thereby to allow a to-and-fro motion thereof along the longitudinal direction thereof and an oscillating motion thereof about said link bracket support, a steering column and crank gear transmission means connecting said steering column with said another extremity of said connected rod member thereby to impart an angular and a reciprocating motion to said connecting rod member when the steering column is rotated, and to swivel thereby the bracket member and the wheel about the pivot means.

2. A steering mechanism according to claim 1, further comprising a stiffening rod extending from one of said wheels to the other and having the ends thereof hingedly connected with the drums of said wheel, said stiffening rod being arranged offset with respect to the geometric line connecting said pivot means on said wheel drums thereby to determine an articulated quadrilateral linkage between said wheels.

3. A mechanism according to claim 1, wherein said crank gear transmission means comprise a pinion on said column at least one wheel having a toothed sector in mesh with said pinion, a crank pivoted at one end thereof on said wheel near the periphery thereof and hingedly connected with the other end thereof to said another extremity of said connecting rod.

4. A mechanism according to claim 1, wherein said articulated end has articulated connection means providing a hinged connection with said one extremity of said connecting rod allowing more than one degrees of freedom and said pivot means have supporting means allowing more than one degree of freedom.

5. A mechanism according to claim 1, wherein said crank gear transmission means comprise a pinion on said column, two opposite wheels having respective opposite sectors in mesh with said pinion, each of said wheels having a crank pivoted thereon with one end thereof near the periphery of the respective wheel and hingedly connected with the other Nnd thereof to said extremity of the respective connecting rod.

* * * * *